United States Patent
Kwon

(10) Patent No.: US 10,054,515 B2
(45) Date of Patent: Aug. 21, 2018

(54) FOCUSING STATE MEASURING APPARATUS

(71) Applicant: K Lab Co., Ltd., Anyang-si, Gyeonggi-do (KR)

(72) Inventor: Goo Cheol Kwon, Gunpo-si (KR)

(73) Assignee: K Lab Co., Ltd., Anyang-si, Gyeonggi-do (KR)

( * ) Notice: Subject to any disclaimer, the term of this patent is extended or adjusted under 35 U.S.C. 154(b) by 0 days.

(21) Appl. No.: 15/585,959

(22) Filed: May 3, 2017

(65) Prior Publication Data

US 2017/0328807 A1    Nov. 16, 2017

(30) Foreign Application Priority Data

May 16, 2016    (KR) ........................ 10-2016-0059688

(51) Int. Cl.
| | |
|---|---|
| *G01J 1/00* | (2006.01) |
| *G01M 11/02* | (2006.01) |
| *B23K 26/70* | (2014.01) |
| *B23K 26/04* | (2014.01) |
| *G02B 7/32* | (2006.01) |

(52) U.S. Cl.
CPC ....... *G01M 11/0207* (2013.01); *B23K 26/048* (2013.01); *B23K 26/705* (2015.10); *G02B 7/32* (2013.01)

(58) Field of Classification Search
CPC ............... B23K 26/705; B23K 26/048; G01M 11/0207; G02B 7/32; G02B 19/0061; G03B 3/10
USPC .................................. 356/121–123, 138–155
See application file for complete search history.

(56) References Cited

U.S. PATENT DOCUMENTS

2009/0145888 A1    6/2009    Hesse et al.

FOREIGN PATENT DOCUMENTS

| EP | 2062674 A1 | 5/2009 |
|---|---|---|
| JP | 2004-114085 A | 4/2004 |
| JP | 2009-294070 A | 12/2009 |
| KR | 10-2005-0065249 A | 6/2005 |

*Primary Examiner* — Tri T Ton
(74) *Attorney, Agent, or Firm* — Novick, Kim & Lee, PLLC; Sang Ho Lee

(57) ABSTRACT

A focusing state measuring apparatus for measuring a focusing state of a working apparatus with respect to a target object so as to perform work includes: a base plate installed in the working apparatus performing work on the target object and spaced apart from the target object; a first line beam generation unit provided on one side of the base plate and configured to irradiate a first line beam toward the target object; and a second line beam generation unit provided on one side of the base plate so as to be spaced apart from the first line beam generation unit in a first direction and configured to irradiate a second line beam toward the target object. The focusing state of the working apparatus with respect to the target object is determined according to states of the first line beam and the second line beam.

7 Claims, 13 Drawing Sheets

FOCUSING STATE MEASURING APPARATUS

CROSS-REFERENCE(S) TO RELATED APPLICATION

This application claims the priority of Korean Patent Application No. 10-2016-0059688, filed on May 16, 2016, in the Korean Intellectual Property Office, the disclosure of which is incorporated herein in its entirety by reference.

BACKGROUND OF THE INVENTION

Field of the Invention

The present invention relates to a focusing state measuring apparatus, and more particularly, to a focusing state measuring apparatus which is capable of easily measuring a focusing state of a working apparatus with respect to a target object through a simpler structure.

Description of the Related Art

Generally, in addition to a laser processing apparatus such as a laser marking apparatus or a laser welding apparatus, an apparatus for performing various kinds of works (hereinafter, referred to as a working apparatus) includes an optical system for irradiating a laser beam onto a target object.

In order for the working apparatus to more stably and efficiently perform work on the target object, it is very important to accurately measure a focusing state of an optical system included in the working apparatus with respect to a target object and adjust the measured focusing state. In particular, in order to improve work quality of the target object on which work is performed, very important factors are a distance between the optical system included in the working apparatus and the target object (hereinafter, refereed to as a focusing distance) and an angle between the optical system included in the working apparatus (more specifically, a beam irradiated from the optical system) and a work plane of the target object (hereinafter, referred to as a focusing gradient).

For example, a laser marking apparatus, which is one of laser processing apparatuses, is an apparatus that receives a character, a figure, and the like from the outside and controls operations of a laser oscillator and a laser scanner to mark the received character, the received figure, and the like on a target object by using a laser beam. Since the laser beam irradiated by the laser scanner has a spot size of several to several tens of micrometers, it is very important to accurately and constantly maintain a focusing distance (that is, a focal length) and a focusing gradient.

As described above, there exist various methods for measuring and determining the focusing state of the working apparatus with respect to the target object. However, most apparatuses for measuring a focusing state utilizes various types of sensors so as to measure the focusing distance and the focusing gradient, or utilizes a CCD camera to capture an image of patterns or the like formed on the target object and then determine the focusing state through image processing with respect to the captured image. For example, a technology for determining a focusing state of an image by detecting a one-dimensional optical energy distribution from a two-dimensional optical energy distribution with respect to an image of a reference plane is disclosed in Korean Patent Application Publication No. 10-2005-0065249 (published on Jun. 29, 2005) entitled "FOCUS DETECTION AND METHOD AND APPARATUS FOR ADJUSTING GRADIENT BY USING THE SAME".

However, the existing focusing state measuring apparatus has limitations in that a configuration thereof is complicated and costs thereof increase because the focusing state measuring apparatus need to be equipped with a capturing device such as a CCD camera or various types of sensors so as to determine a focusing state of a working apparatus with respect to a target object. In addition, the existing focusing state measuring apparatus has limitations in that a user cannot quickly and easily measure the focusing state of the working apparatus because it is necessary to perform processing on sensor values with respect to a focusing distance and a focusing gradient and perform image processing on an image.

Therefore, there is a need for a focusing state measuring apparatus which is capable of easily measuring a focusing state of a working apparatus with respect to a target object through a simpler structure.

SUMMARY OF THE INVENTION

An aspect of the present invention is directed to provide a focusing state measuring apparatus which determines a focusing state of a working apparatus with respect to a target object by using states of a first beam and a second beam irradiated onto the target object, thereby easily measuring the focusing state of the working apparatus with respect to the target object through a simpler structure.

The technical objects of the present invention are not limited to the above-mentioned object, and other technical objects will be clearly understood from the following description by those skilled in the art.

According to a first embodiment of the present invention, a focusing state measuring apparatus for measuring a focusing state of a working apparatus with respect to a target object so as to perform work includes: a base plate installed in the working apparatus performing work on the target object and spaced apart from the target object; a first line beam generation unit provided on one side of the base plate and configured to irradiate a first line beam toward the target object; and a second line beam generation unit provided on one side of the base plate so as to be spaced apart from the first line beam generation unit in a first direction and configured to irradiate a second line beam toward the target object, wherein the focusing state of the working apparatus with respect to the target object is determined according to states of the first line beam and the second line beam.

The focusing state of the working apparatus may include: a focusing distance indicating a separation distance between the working apparatus and the target object; and a focusing gradient indicating a tilt degree of the working apparatus with respect to a work plane of the target object.

The focusing distance may be determined according to a distance between the first line beam and the second line beam, and the focusing gradient may be determined according to an angle between the first line beam and the second line beam or a length difference between the first line beam and the second line beam.

The focusing state measuring apparatus may further include a focusing measurement unit configured to measure the states of the first line beam and the second line beam irradiated onto the target object and determine the focusing state of the working apparatus with respect to the target object.

According to a second embodiment of the present invention, a focusing state measuring apparatus for measuring a focusing state of a working apparatus with respect to a target object so as to perform work includes: a base plate installed in the working apparatus performing work on the target object and spaced apart from the target object; a first line beam generation unit provided on one side of the base plate and configured to irradiate a first line beam toward the target object; a second line beam generation unit provided on one side of the base plate so as to be spaced apart from the first line beam generation unit in a first direction and configured to irradiate a second line beam toward the target object; a third line beam generation unit provided one side of the base plate so as to be disposed between the first line beam generation unit and the second line beam generation unit and configured to irradiate a third line beam toward the target object; and a fourth line beam generation unit provided on one side of the base plate so as to be spaced apart from the third line beam generation unit in a second direction perpendicular to the first direction and configured to irradiate a fourth line beam toward the target object, wherein the focusing state of the working apparatus with respect to the target object is determined according to states of the first line beam and the second line beam and states of the third line beam and the fourth line beam.

The focusing state of the working apparatus may include: a focusing distance indicating a separation distance between the working apparatus and the target object; and a focusing gradient indicating a tilt degree of the working apparatus with respect to a work plane of the target object.

The focusing distance may be determined according to a distance between the first line beam and the second line beam or a distance between the third line beam and the fourth line beam, and the focusing gradient may be determined according to an angle between the first line beam and the second line beam, an angle between the third line beam and the fourth line beam, a length difference between the first line beam and the second line beam, or a length difference between the third line beam and the fourth line beam.

The focusing state measuring apparatus may further include a focusing measurement unit configured to measure the states of the first line beam and the second line beam irradiated onto the target object and the states of the third line beam and the fourth line beam irradiated onto the target object and determine the focusing state of the working apparatus with respect to the target object.

Specific matters of the embodiments are included in the detailed description and the drawings.

DETAILED DESCRIPTION OF EMBODIMENTS

Figure 1:
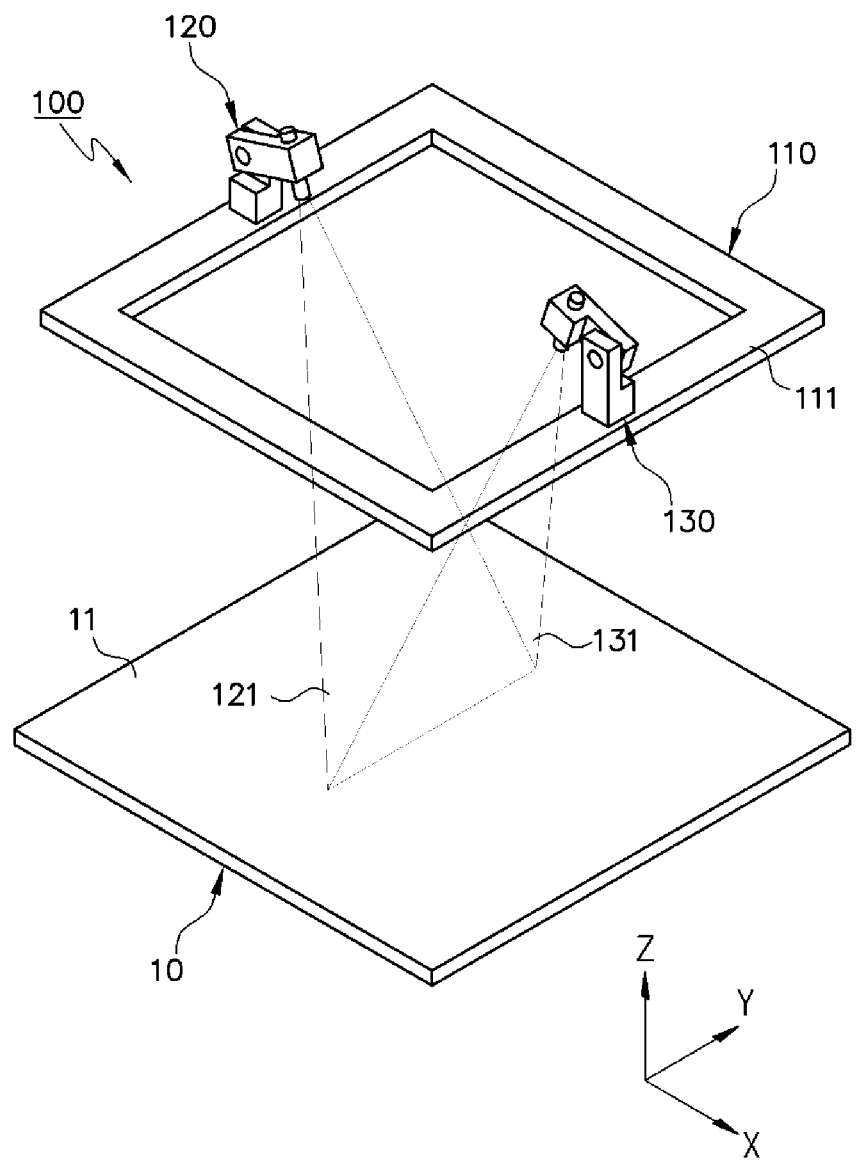
FIG. 1 is a schematic perspective view illustrating a focusing state measuring apparatus according to a first embodiment of the present invention.

Hereinafter, preferred embodiments of the present invention will be described in detail with reference to the accompanying drawings in such a manner that the present invention can be easily carried out by those skilled in the art to which the present invention pertains.

Detailed description of well-known functions and structures incorporated herein may be omitted to avoid obscuring the subject matter of the present invention. This aims to omit unnecessary description so as to make the subject matter of the present invention clearer.

For the same reason, some of elements are exaggerated, omitted, or simplified in the drawings, and in practice, the elements may have sizes and/or shapes different from those shown in drawings. The same reference numbers are used to refer to the same or like parts throughout the specification and the drawings.

Furthermore, it will be understood that expressions and terms related with direction (for example, "front", "back", "up" "down", "top", "bottom", "left", "right" "lateral", etc.) of an apparatus or elements are used to simplify description for the present invention but not meant to represent that the related apparatus or elements should be directed in certain directions.

Hereinafter, the present invention will be described with reference to the drawings for describing focusing state measuring apparatuses 100 according to embodiments of the present invention.

Figure 2:
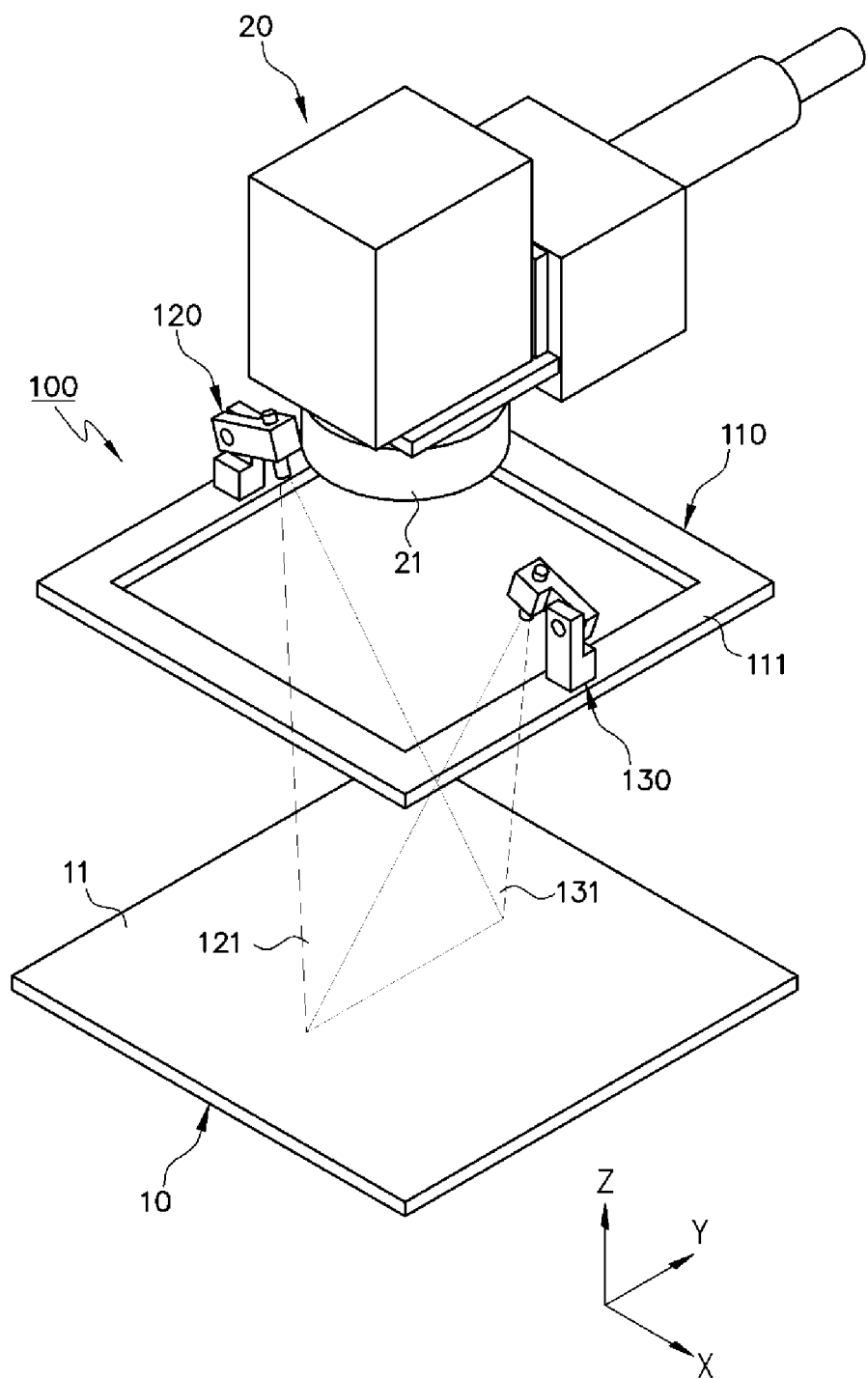
FIG. 2 is a perspective view illustrating an example in which the focusing state measuring apparatus according to the first embodiment of the present invention is installed in a laser processing apparatus.

FIG. 1 is a schematic perspective view illustrating a focusing state measuring apparatus 100 according to a first embodiment of the present invention, and FIG. 2 is a perspective view illustrating an example in which the focusing state measuring apparatus 100 according to the first embodiment of the present invention is installed in a laser processing apparatus 20.

As illustrated in FIG. 1, the focusing state measuring apparatus 100 according to the first embodiment of the present invention may include a base plate 110, a first line beam generation unit 120, and a second line beam generation unit 130.

As illustrated in FIG. 2, the focusing state measuring apparatus 100 according to the first embodiment of the present invention may be installed below the laser processing apparatus 20 (more specifically, below a laser scanner 21) and may measure a focusing state of a working apparatus with respect to a target object 10 so as to perform work. In the present invention, the laser processing apparatus 20 such as a laser marking apparatus or a laser welding apparatus is described as an example of the working apparatus, but the present invention is not limited thereto. The focusing state measuring apparatus 100 according to the first embodiment of the present invention may be applied to various types of working apparatuses performing work on the target object 10.

The base plate 110 may have an approximately thin plate shape. The base plate 110 may be installed in the working apparatus (laser processing apparatus 20) performing work on the target object 10, and may be spaced apart from the target object 10. As illustrated in FIG. 1, the base plate 110 may be opened in a center thereof so as to transmit a first line beam 121 and a second line beam 131 respectively irradiated from the first line beam generation unit 120 and the second line beam generation unit 130 to be described later.

The first line beam generation unit 120 may be provided on one side of the base plate 110 and configured to irradiate the first line beam 121 toward the target object 10. In addition, the second line beam generation unit 130 may be provided on one side of the base plate 110 so as to be spaced apart from the first line beam generation unit 120 by a certain distance in a first direction (+X direction in FIG. 1) and configured to irradiate the second line beam 131 toward the target object 10. Each of the first line beam generation unit 120 and the second line beam generation unit 130 may use a line laser configured to generate a line beam having a certain line width and a certain length.

As illustrated in FIGS. 1 and 2, the first line beam generation unit 120 and the second line beam generation unit 130 may be installed on a horizontal plane 111 of the base plate 110 at a certain angle in a state of being spaced apart from each other in the first direction (±X direction in FIG. 1), such that the first line beam 121 and the second line beam 131 are inclinedly irradiated toward the target object 10. In addition, the first line beam generation unit 120 and the second line beam generation unit 130 may be installed such that the first line beam 121 and the second line beam 131 are formed to be elongated on a work plane 11 of the target object 10 in a second direction (±Y direction in FIG. 1) perpendicular to the first direction (±X direction in FIG. 1).

In this case, a distance between the first line beam generation unit 120 and the second line beam generation unit 130, a separation distance between the first line beam generation unit 120 and the target object 10, a separation distance between the second line beam generation unit 130 and the target object 10, and an installation angle of the first line beam generation unit 120 and the second line beam generation unit 130 may be determined in advance according to conditions such as a type of the working apparatus and an installation state of the working apparatus.

For example, in an example of FIG. 2, the first line beam generation unit 120 and the second line beam generation unit 130 may be installed in advance such that the first line beam 121 and the second line beam 131 irradiated onto the target object 10 match each other when the laser scanner 21 is spaced apart from the target object 10 by a focal length of the laser scanner 21 and the laser scanner 21 is parallel to the work plane 11 of the target object 10, taking into account the focal length of the laser scanner 21.

On the other hand, in the focusing state measuring apparatus 100 according to the first embodiment of the present invention, the focusing state of the working apparatus with respect to the target object 10 may be determined according to states of the first line beam 121 and the second line beam 131 irradiated onto the target object 10. The focusing state of the working apparatus may include a focusing distance indicating a separation distance between the working apparatus and the target object 10 and a focusing gradient indicating a tilt degree of the working apparatus with respect to the work plane 11 of the target object 10.

In particular, the focusing distance of the working apparatus may be determined according to a distance between the first line beam 121 and the second line beam 131. The focusing gradient of the working apparatus may be determined according to an angle between the first line beam 121 and the second line beam 131 or a length difference between the first line beam 121 and the second line beam 131.

Hereinafter, a method for measuring the focusing state of the working apparatus by using the focusing state measuring apparatus 100 according to the first embodiment of the present invention will be described with reference to FIGS. 3A to 8.

Figure 3A:
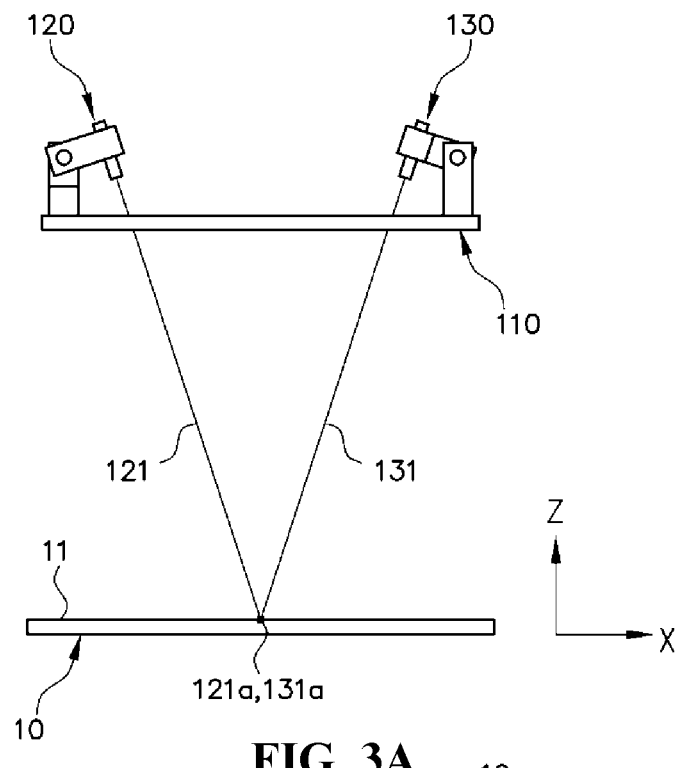
FIGS. 3A and 3B are views illustrating a case where, as a measurement result of the focusing state measuring apparatus according to the first embodiment of the present invention, a focusing state of a working apparatus is accurate.
Figure 3B:
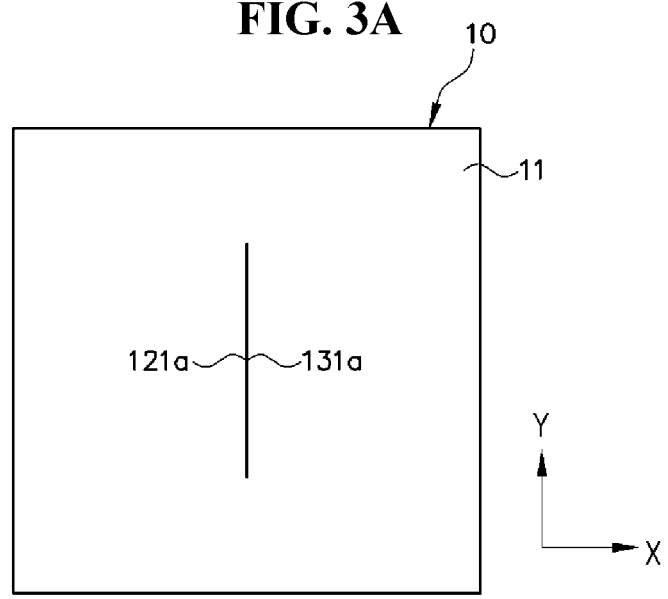

FIGS. 3A and 3B are views illustrating a case where, as a measurement result of the focusing state measuring apparatus 100 according to the first embodiment of the present invention, the focusing state of the working apparatus is accurate.

FIG. 3A illustrates a position of the focusing state measurement apparatus 100 installed in the working apparatus when the focusing state of the working apparatus with respect to the target object 10 is accurate, and FIG. 3B illustrates states of a first line beam 121a and a second line beam 131a irradiated onto the target object 10 when the focusing state of the working apparatus with respect to the target object 10 is accurate.

As illustrated in FIGS. 3A and 3B, when the focusing state of the working apparatus with respect to the target object 10 is accurate, the focusing distance of the working apparatus may be equal to a preset reference distance (for example, a distance between the base plate 110 and the work plane 11 of the target object 10 at a focal length of the laser scanner 21), and the focusing gradient of the working apparatus is parallel to the work plane 11 of the target object 10 (for example, the laser scanner 21 is parallel to the work plane 11 of the target object 10). Thus, the first line beam 121a and the second line beam 131a irradiated onto the target object 10 may exactly match each other.

Therefore, as a result of visually checking the states of the first line beam 121a and the second line beam 131a irradiated onto the target object 10, when the first line beam 121a and the second line beam 131a match each other, a user may determine that the focusing state of the working apparatus with respect to the target object 10 is accurate.

Figures 4A, 4B:
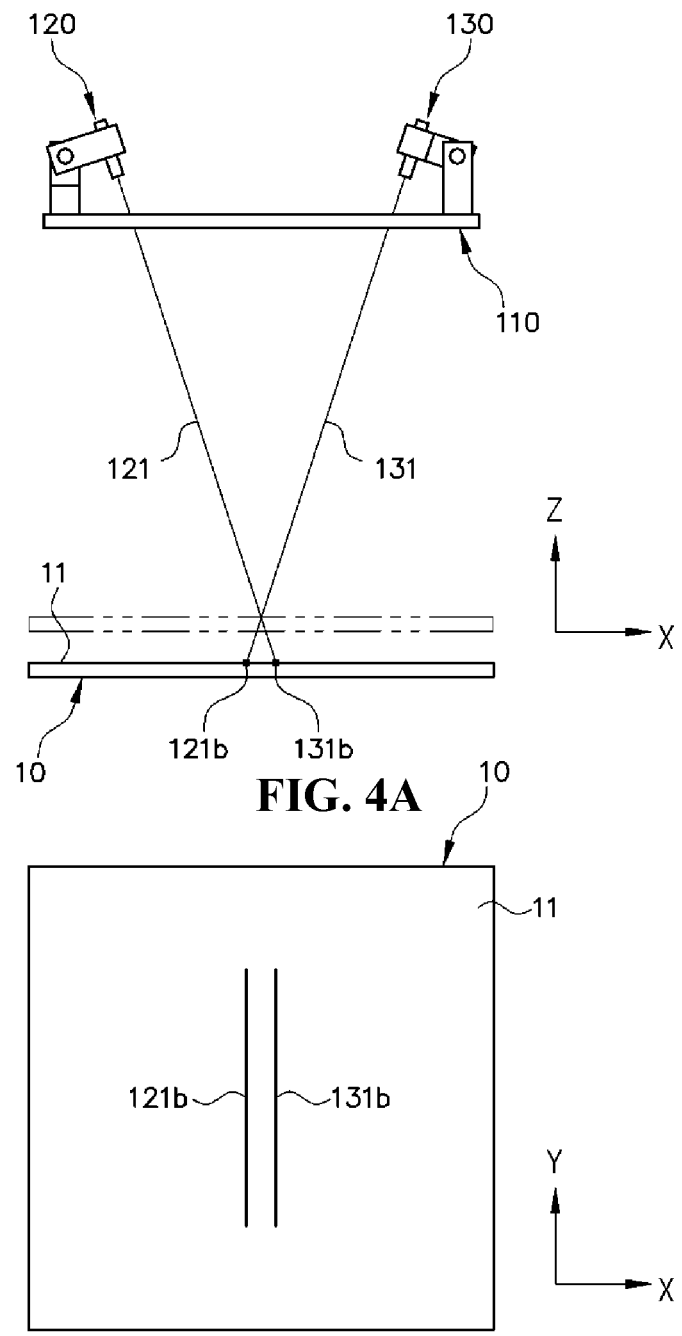
FIGS. 4A and 4B are views illustrating a case where, as a measurement result of the focusing state measuring apparatus according to the first embodiment of the present invention, a focusing distance of a working apparatus is longer than a preset reference distance.
Figure 5A:
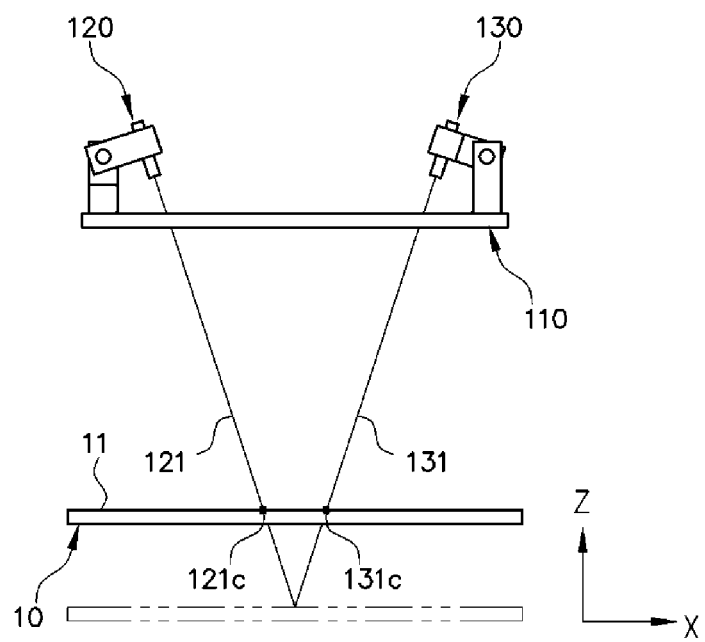
FIGS. 5A and 5B are views illustrating a case where, as a measurement result of the focusing state measuring apparatus according to the first embodiment of the present invention, a focusing distance of a working apparatus is shorter than a preset reference distance.
Figure 5B:
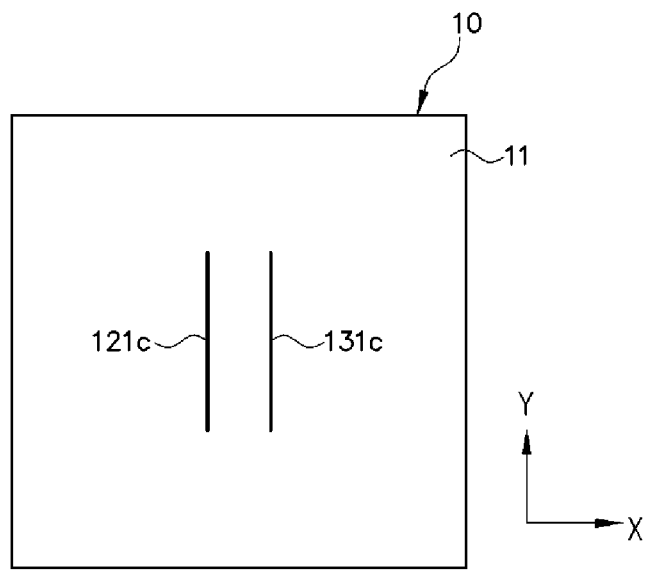

FIGS. 4A and 4B are views illustrating a case where, as a measurement result of the focusing state measuring apparatus 100 according to the first embodiment of the present invention, the focusing distance of the working apparatus is longer than a preset reference distance, and FIGS. 5A and 5B are views illustrating a case where, as a measurement result of the focusing state measuring apparatus 100 according to the first embodiment of the present invention, the focusing distance of the working apparatus is shorter than the preset reference distance.

FIG. 4A illustrates a position of the focusing state measuring apparatus 100 installed in the working apparatus when the focusing distance of the working apparatus with respect to the target object 10 is longer than the preset reference distance, and FIG. 4B illustrates states of a first line beam 121b and a second line beam 131b irradiated onto the target object 10 when the focusing distance of the working apparatus with respect to the target object 10 is longer than the preset reference distance.

As illustrated in FIGS. 4A and 4B, when the focusing distance of the working apparatus with respect to the target object 10 is longer than the preset reference distance, the first line beam 121b and the second line beam 131b irradiated onto the target object 10 may be formed to be relatively longer than the preset reference distance and spaced apart from each other.

Therefore, as a result of visually checking the states of the first line beam 121b and the second line beam 131b irradiated onto the target object 10, when the first line beam 121a and the second line beam 131a are formed to be relatively longer than the preset reference distance and spaced apart from each other, the user may determine that the focusing distance of the working apparatus with respect to the target object 10 is longer than the preset reference distance.

On the contrary, FIG. 5A illustrates a position of the focusing state measuring apparatus 100 installed in the working apparatus when the focusing distance of the working apparatus with respect to the target object 10 is shorter than a preset reference distance, and FIG. 5B illustrates states of a first line beam 121c and a second line beam 131c irradiated onto the target object 10 when the focusing distance of the working apparatus with respect to the target object 10 is shorter than the preset reference distance.

As illustrated in FIGS. 5A and 5B, when the focusing distance of the working apparatus with respect to the target object 10 is shorter than the preset reference distance, the first line beam 121c and the second line beam 131c irradiated onto the target object 10 may be formed to be relatively shorter than the preset reference distance and spaced apart from each other.

Therefore, as a result of visually checking the state of the first line beam 121c and the second line beam 131c irradiated onto the target object 10, when the first line beam 121c and the second line beam 131c are formed to be relatively shorter than the preset reference distance and spaced apart from each other, the user may determine that the focusing distance of the working apparatus with respect to the target object 10 is shorter than the preset reference distance.

Consequently, as illustrated in FIGS. 4A to 5B, when the first line beam 121b and the second line beam 131b irradiated onto the target object 10 are spaced apart from each other and when the first line beam 121c and the second line beam 131c irradiated onto the target object 10 are spaced apart from each other, the user may determine that the focusing distance of the working apparatus with respect to the target object 10 is inaccurate.

Figure 6A:
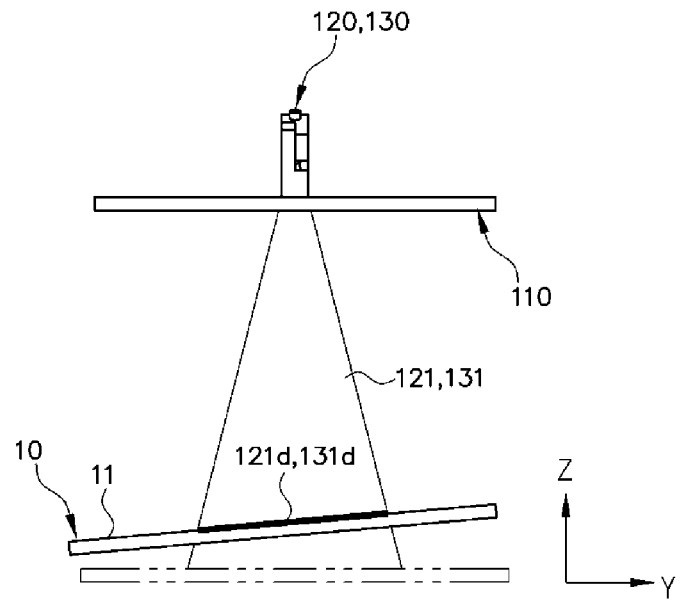
FIGS. 6A and 6B are views illustrating an example in which, as a measurement result of the focusing state measuring apparatus according to the first embodiment of the present invention, a focusing gradient of a working apparatus is tilted.
Figure 6B:
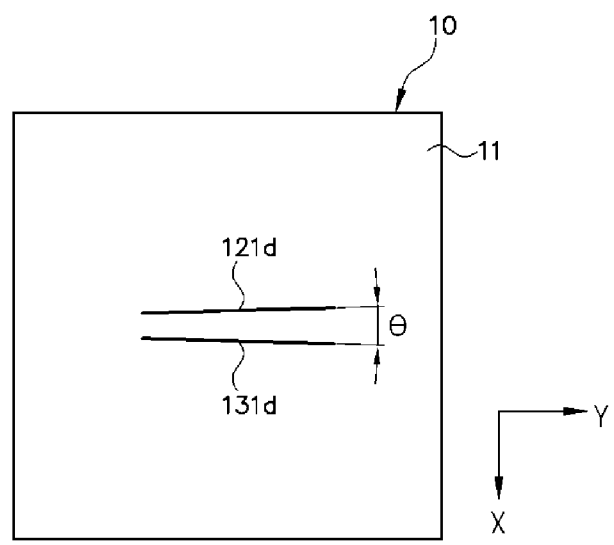
Figure 7A:
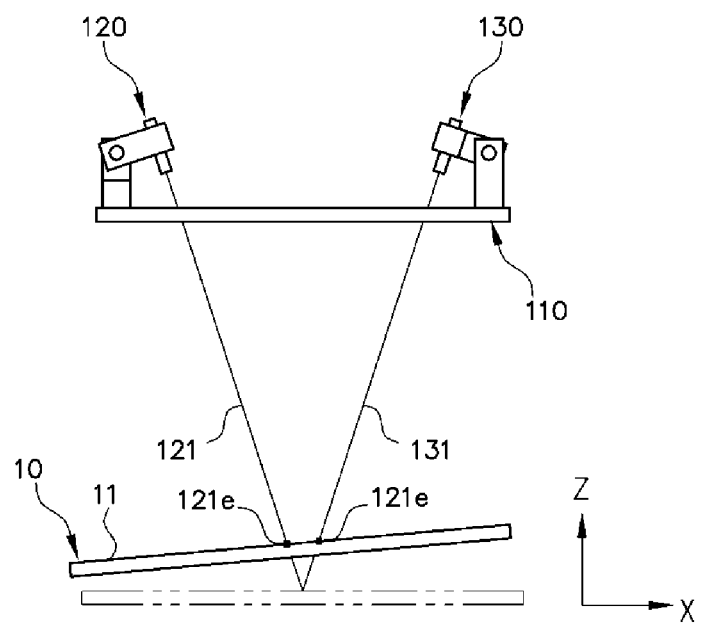
FIGS. 7A and 7B are views illustrating another example in which, as a measurement result of the focusing state measuring apparatus according to the first embodiment of the present invention, a focusing gradient of a working apparatus is tilted.
Figure 7B:
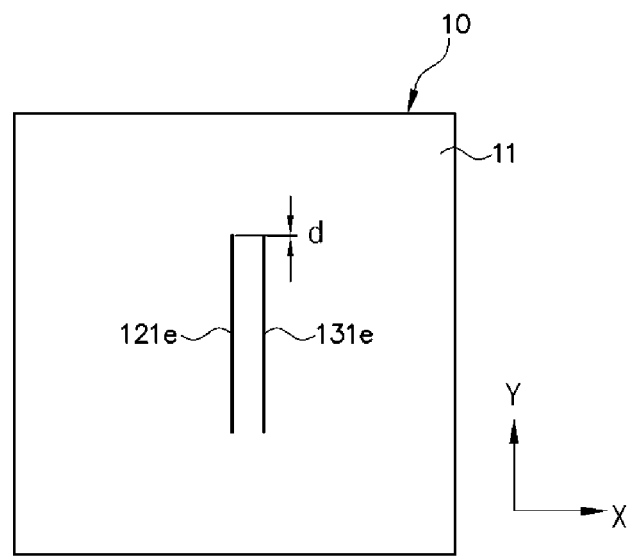

FIGS. 6A and 6B are views illustrating an example in which, as a measurement result of the focusing state measuring apparatus according to the first embodiment of the present invention, a focusing gradient of a working apparatus is tilted, and FIGS. 7A and 7B are views illustrating another example in which, as a measurement result of the focusing state measuring apparatus according to the first embodiment of the present invention, a focusing gradient of the working apparatus is tilted.

In an example, FIG. 6A illustrates a position of the focusing state measuring apparatus 100 installed in the working apparatus when the focusing gradient of the working apparatus with respect to the target object 10 is tilted along an axis of a first direction (±X direction in FIG. 1), and FIG. 6B illustrates states of a first line beam 121d and a second line beam 131d irradiated onto the target object 10 when the focusing gradient of the working apparatus with respect to the target object 10 is tilted along the axis of the first direction (±X direction in FIG. 1).

As illustrated in FIGS. 6A and 6B, when the focusing gradient of the working apparatus with respect to the target object 10 is tilted along the axis of the first direction (±X direction in FIG. 1), the first line beam 121d and the second line beam 131d irradiated onto the target object 10 may not be parallel to each other and may be spaced apart from each other by a certain angle θ.

Therefore, as a result of visually checking the states of the first line beam 121d and the second line beam 131d irradiated onto the target object 10, when the first line beam 121d and the second line beam 131d are spaced apart from each other in a state of being not parallel to each other, the user may determine that the focusing gradient of the working apparatus with respect to the target object 10 is tilted along the axis of the first direction (±X direction in FIG. 1).

In another example, FIG. 7A illustrates a position of the focusing state measuring apparatus 100 installed in the working apparatus when the focusing gradient of the working apparatus with respect to the target object 10 is tilted along an axis of a second direction (±Y direction in FIG. 1) perpendicular to the first direction (±X direction in FIG. 1), and FIG. 7B illustrates states of a first line beam 121e and a second line beam 131e irradiated onto the target object 10 when the focusing gradient of the working apparatus with respect to the target object 10 is tilted along the axis of the second direction (±Y direction in FIG. 1).

As illustrated in FIGS. 7A and 7B, when the focusing gradient of the working apparatus with respect to the target object 10 is tilted along the axis of the second direction (±Y direction in FIG. 1), the first line beam 121e and the second line beam 131e irradiated onto the target object 10 may be spaced apart from each other in a state of having different lengths (length difference d).

Therefore, as a result of visually checking the states of the first line beam 121e and the second line beam 131e irradiated onto the target object 10, when the first line beam 121e and the second line beam 131e are spaced apart from each other in a state of having different lengths, the user may determine that the focusing gradient of the working apparatus with respect to the target object 10 is tilted along the axis of the second direction (±Y direction in FIG. 1).

On the other hand, the focusing state measuring apparatus 100 according to the first embodiment of the present invention may further include a focusing measurement unit 160 configured to measure the states of the first line beam 121 and the second line beam 131 irradiated onto the target object 10 and determine the focusing state of the working apparatus with respect to the target object 10.

Figure 8:
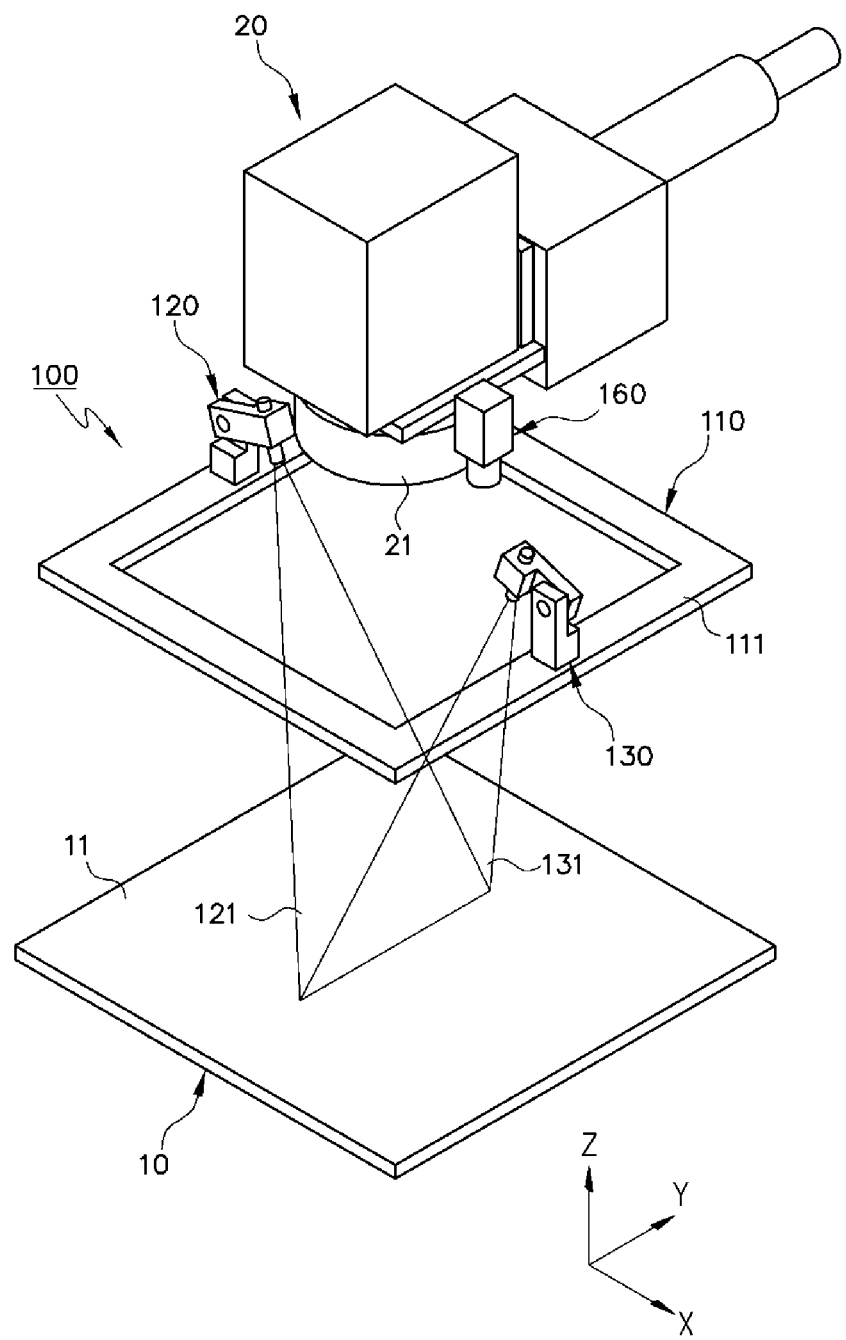
FIG. 8 is a perspective view illustrating a case where a focusing measurement unit is installed in the focusing state measuring apparatus according to the first embodiment of the present invention.

FIG. 8 is a perspective view illustrating a case where the focusing measurement unit 160 is installed in the focusing state measuring apparatus 100 according to the first embodiment of the present invention.

As illustrated in FIG. 8, the focusing measurement unit 160 is installed adjacent to the working apparatus (laser processing apparatus 20) and configured to measure the states of the first line beam 121 and the second line beam 131 irradiated onto the target object 10 and determine the focusing state of the working apparatus with respect to the target object 10. That is, the focusing measurement unit 160 may more accurately measure the states of the first line beam 121 and the second line beam 131 by complementing the process of the user's visual checking the states of the first line beam 121 and the second line beam 131.

The focusing measurement unit 160 may use a vision camera configured to capture an image of the states of the first line beam 121 and the second line beam 131 and determine the focusing state of the working apparatus with respect to the target object 10 through the captured image.

On the other hand, although FIG. 8 illustrates an example in which the focusing measurement unit 160 is installed on one side of the laser scanner 21, the focusing measurement unit 160 may also be installed on one side of the base plate 110.

As described above, since the focusing state measuring apparatus 100 according to the first embodiment of the present invention determines the focusing state of the working apparatus with respect to the target object 10 by using the states of the first line beam 121 and the second line beam 131 irradiated onto the target object 10, it is possible to easily measure the focusing state of the working apparatus with respect to the target object 10 through a simpler structure.

Hereinafter, a structure of a focusing state measuring apparatus 100 according to a second embodiment of the present invention will be described with reference to FIGS. 9 to 13B. A description of the same parts as those in the first embodiment illustrated in FIGS. 1 to 8 will be omitted for convenience of description, and the following description will be made focusing on a difference from the first embodiment.

Figure 9:
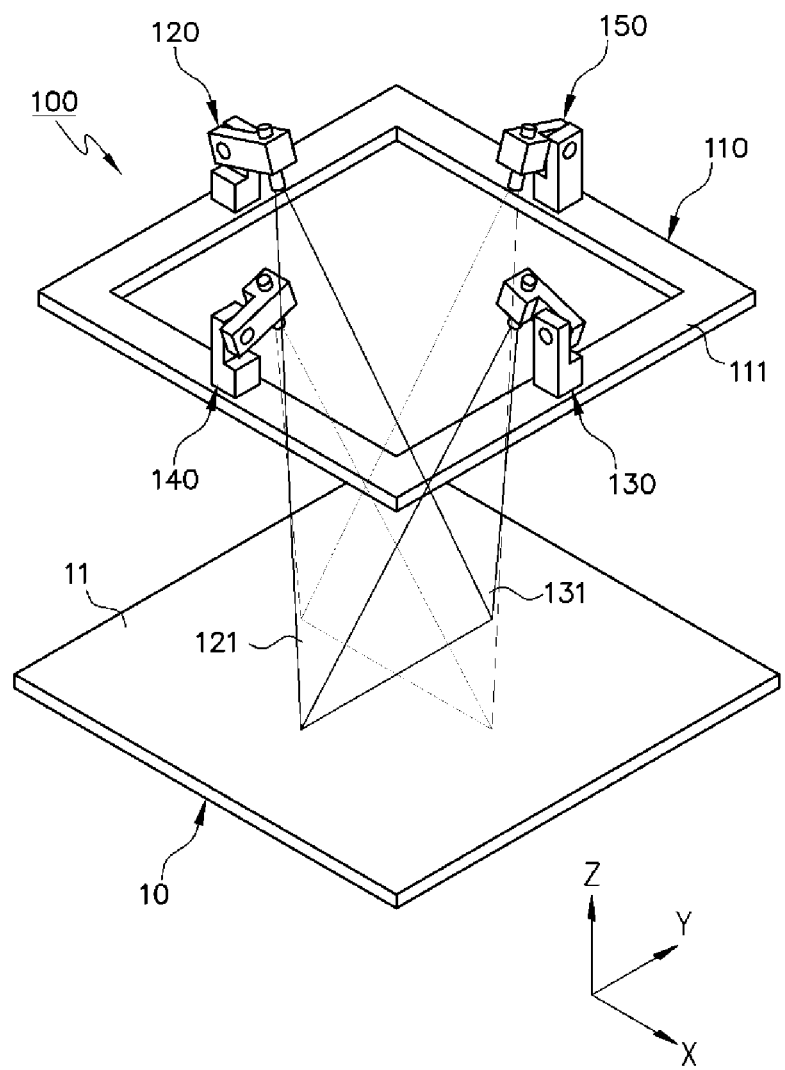
FIG. 9 is a schematic perspective view illustrating a focusing state measuring apparatus according to a second embodiment of the present invention.

FIG. 9 is a schematic perspective view illustrating a focusing state measuring apparatus according to a second embodiment of the present invention.

As illustrated in FIG. 9, the focusing state measuring apparatus 100 according to the second embodiment of the present invention may further include a third line beam generation unit 140 and a fourth line beam generation unit 150, in addition to the first line beam generation unit 120 and the second line beam generation unit 130 included in the focusing state measuring apparatus 100 according to the first embodiment of the present invention.

The third line beam generation unit 140 may be provided on one side of a base plate 110 so as to be located between the first line beam generation unit 120 and the second line beam generation unit 130 and configured to irradiate a third line beam 141 toward a target object 10. In addition, the fourth line beam generation unit 150 may be provided on one side of the base plate 110 so as to be spaced apart from the third line beam generation unit 140 in a second direction (+Y direction in FIG. 9) perpendicular to a first direction and configured to irradiate a fourth line beam 151 toward the target object 10.

Therefore, in the focusing state measuring apparatus 100 according to the second embodiment of the present invention, a focusing state (focusing distance and focusing gradient) of a working apparatus with respect to the target object 10 may be determined according to states of the first line beam 121 and the second line beam 131 and states of the third line beam 141 and the fourth line beam 151 irradiated onto the target object 10.

In particular, the focusing distance of the working apparatus may be determined according to a distance between the first line beam 121 and the second line beam 131 or a distance between the third line beam 141 and the fourth line beam 151. The focusing gradient of the working apparatus may be determined according to an angle between the first line beam 121 and the second line beam 131, an angle between the third line beam 141 and the fourth line beam 151, a length difference between the first line beam 121 and the second line beam 131, or a length difference between the third line beam 141 and the fourth line beam 151.

Hereinafter, a focusing state measuring method of a working apparatus by using the focusing state measuring apparatus 100 according to the second embodiment of the present invention will be described with reference to FIGS. 10A to 13B.

Figure 10A:
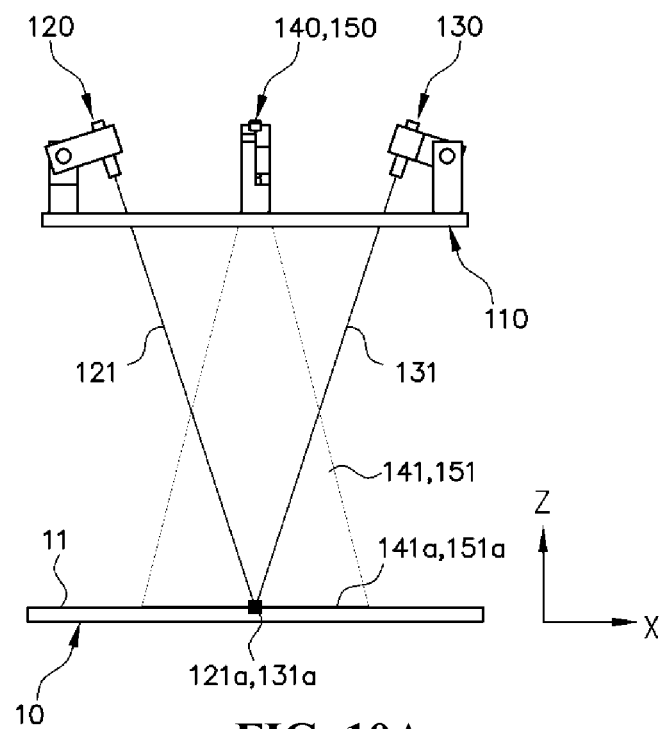
FIGS. 10A and 10B are views illustrating a case where, as a measurement result of the focusing state measuring apparatus according to the second embodiment of the present invention, a focusing state of a working apparatus is accurate.
Figure 10B:
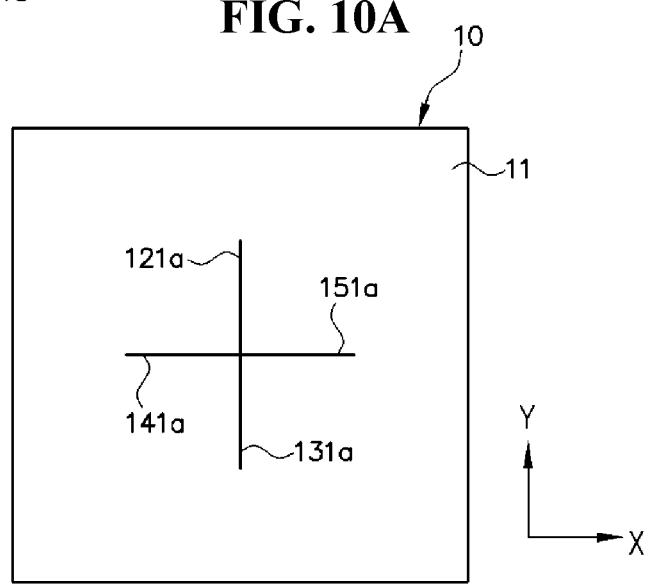

FIGS. 10A and 10B are views illustrating a case where, as a measurement result of the focusing state measuring apparatus according to the second embodiment of the present invention, the focusing state of the working apparatus is accurate.

FIG. 10A illustrates a position of the focusing state measuring apparatus 100 installed in the working apparatus when the focusing state of the working apparatus with respect to the target object 10 is accurate, and FIG. 10B illustrates states of a first line beam 121a, a second line beam 131a, a third line beam 141a, and a fourth line beam 151a irradiated onto the target object 10 when the focusing state of the working apparatus with respect to the target object 10 is accurate.

As illustrated in FIGS. 10A and 10B, when the focusing state of the working apparatus with respect to the target object 10 is accurate, the first line beam 121a and the second line beam 131a irradiated onto the target object 10 may accurately match each other and the third line beam 141a and the fourth line beam 151a may accurately mach each other. Accordingly, the first line beam 121a, the second line beam 131a, the third line beam 141a, and the fourth line beam 151a may form a "+" shape as a whole.

Therefore, as a result of visually checking the states of the first line beam 121a, the second line beam 131a, the third line beam 141a, and the fourth line beam 151a irradiated onto the target object 10, when the first line beam 121a, the second line beam 131a, the third line beam 141a, and the fourth line beam 151a form a "+" shape as a whole, the user may determine that the focusing state of the working apparatus with respect to the target object 10 is accurate.

Figures 11A, 11B:
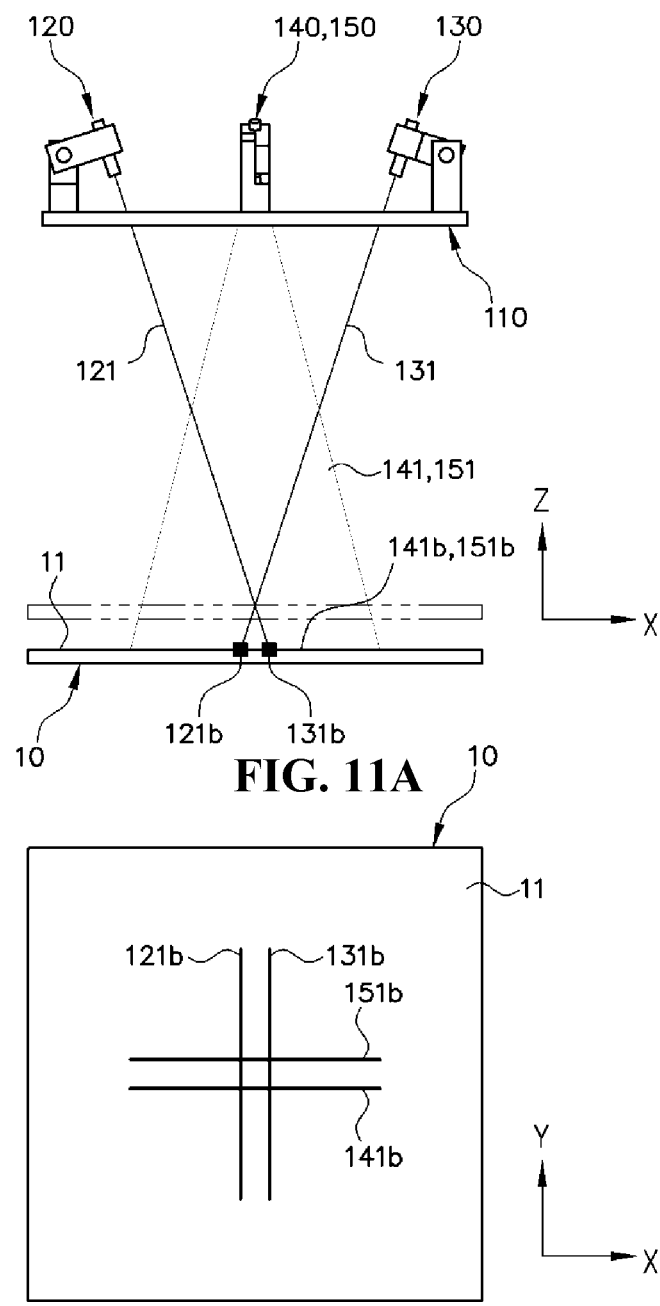
FIGS. 11A and 11B are views illustrating a case where, as a measurement result of the focusing state measuring apparatus according to the second embodiment of the present invention, a focusing state of a working apparatus is longer than a preset reference distance.
Figure 12A:
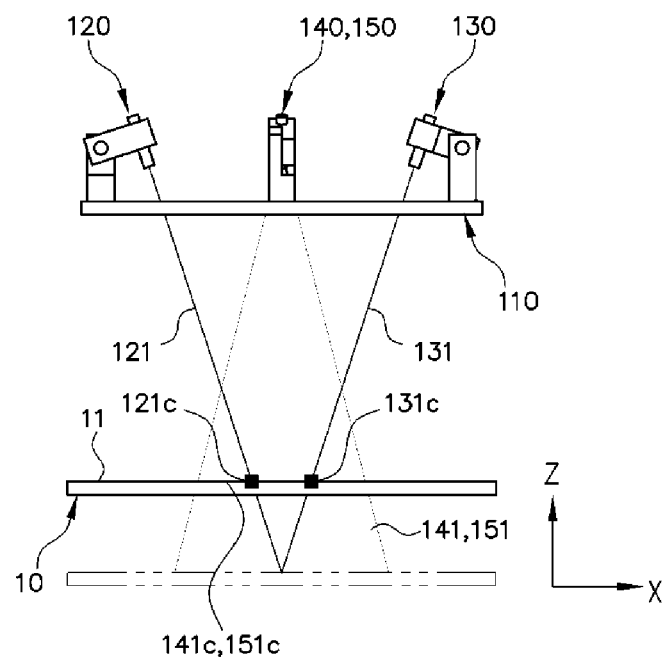
FIGS. 12A and 12B are views illustrating a case where, as a measurement result of the focusing state measuring apparatus according to the second embodiment of the present invention, a focusing state of a working apparatus is shorter than the preset reference distance.
Figure 12B:
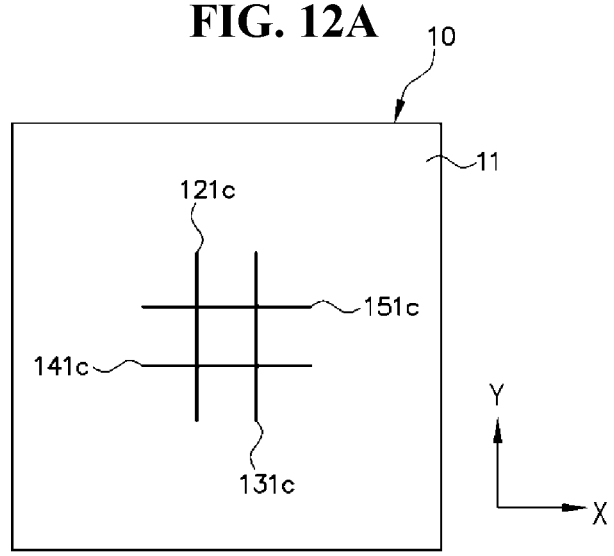

FIGS. 11A and 11B are views illustrating a case where, as a measurement result of the focusing state measuring apparatus according to the second embodiment of the present invention, the focusing state of the working apparatus is longer than a preset reference distance, and FIGS. 12A and 12B are views illustrating a case where, as a measurement result of the focusing state measuring apparatus according to the second embodiment of the present invention, the focusing state of the working apparatus is shorter than the preset reference distance.

FIG. 11A illustrates a position of the focusing state measuring apparatus 100 installed in the working apparatus when the focusing distance of the working apparatus with respect to the target object 10 is longer than the preset reference distance, and FIG. 11B illustrates states of a first line beam 121b, a second line beam 131b, a third line beam 141b, and a fourth line beam 151b irradiated onto the target object 10 when the focusing distance of the working apparatus with respect to the target object 10 is longer than the preset reference distance.

As illustrated in FIGS. 11A and 11B, when the focusing distance of the working apparatus with respect to the target object 10 is longer than the preset reference distance, the first line beam 121b, the second line beam 131b, the third line beam 141b, and the fourth line beam 151b irradiated onto the target object 10 may be formed to be relatively longer than the preset reference distance and spaced apart from one another to have a ⧣ shape as a whole.

Therefore, as a result of visually checking the states of the first line beam 121b, the second line beam 131b, the third line beam 141b, and the fourth line beam 151b irradiated onto the target object 10, when the first line beam 121b, the second line beam 131b, the third line beam 141b, and the fourth line beam 151b are formed to be relatively longer than the preset reference distance and has a ⧣ shape as a whole, the user may determine that the focusing distance of the working apparatus with respect to the target object 10 is longer than the preset reference distance.

On the contrary, FIG. 12A illustrates a position of the focusing state measuring apparatus 100 installed in the working apparatus when the focusing distance of the working apparatus with respect to the target object 10 is shorter than the preset reference distance, and FIG. 12B illustrates states of a first line beam 121c, a second line beam 131c, a third line beam 141c, and a fourth line beam 151c irradiated onto the target object 10 when the focusing distance of the working apparatus with respect to the target object 10 is shorter than the preset reference distance.

As illustrated in FIGS. 12A and 12B, when the focusing distance of the working apparatus with respect to the target object 10 is shorter than the preset reference distance, the first line beam 121c, the second line beam 131c, the third line beam 141c, and the fourth line beam 151c irradiated onto the target object 10 may be formed to be relatively shorter than the preset reference distance and spaced apart from one another to have a ⧣ shape as a whole.

Therefore, as a result of visually checking the states of the first line beam 121c, the second line beam 131c, the third line beam 141c, and the fourth line beam 151c irradiated onto the target object 10, when the first line beam 121c, the second line beam 131c, the third line beam 141c, and the fourth line beam 151c are formed to be relatively shorter than the preset reference distance and has a ⧣ shape as a whole, the user may determine that the focusing distance of the working apparatus with respect to the target object 10 is shorter than the preset reference distance.

As a result, as illustrated in FIGS. 11A to 12B, when the first line beam 121b, the second line beam 131b, the third line beam 141b, and the fourth line beam 151b irradiated onto the target object 10 has a ⧣ shape as a whole or when the first line beam 121c, the second line beam 131c, the third line beam 141c, and the fourth line beam 151c irradiated onto the target object 10 has a ⧣ shape as a whole, the user may determine that the focusing distance of the working apparatus with respect to the target object 10 is inaccurate.

Figures 13A, 13B:
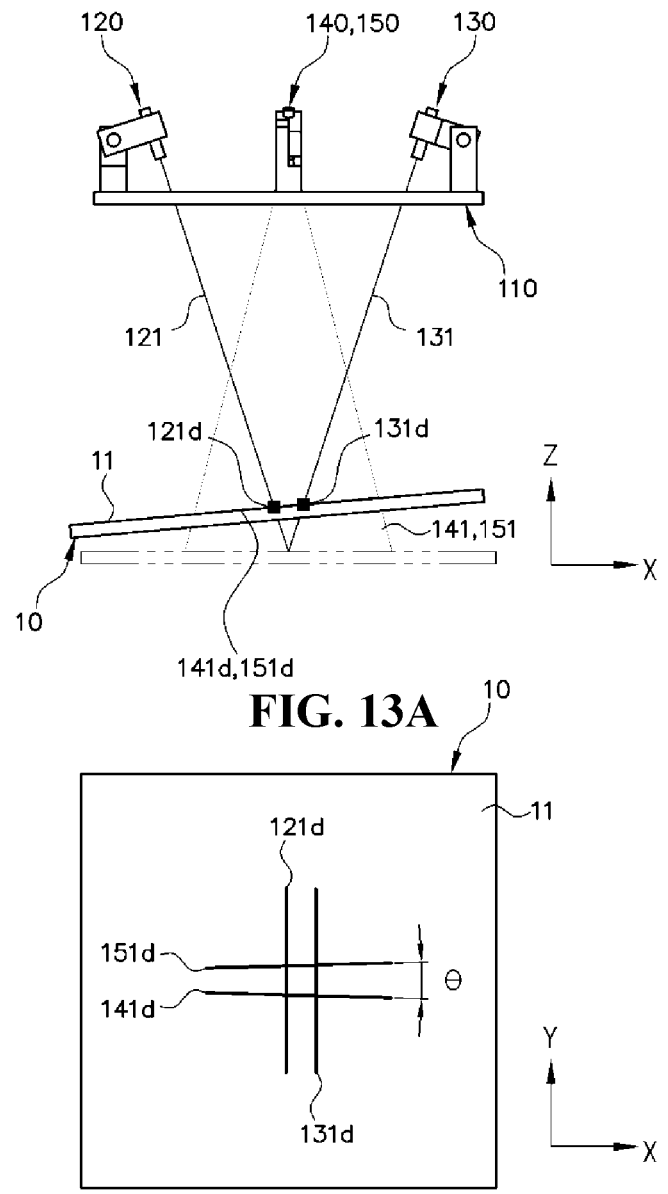
FIGS. 13A and 13B are views illustrating a case where, as a measurement result of the focusing state measuring apparatus according to the second embodiment of the present invention, a focusing gradient of a working apparatus is tilted.

FIGS. 13A and 13B are views illustrating a case where, as a measurement result of the focusing state measuring apparatus according to the second embodiment of the present invention, the focusing gradient of the working apparatus is tilted.

FIG. 13A illustrates a position of the focusing state measuring apparatus 100 installed in the working apparatus when the focusing gradient of the working apparatus with respect to the target object 10 is tilted along an axis of the second direction (±Y direction in FIG. 1), and FIG. 13B illustrates states of a first line beam 121d, a second line beam 131d, a third line beam 141d, and a fourth line beam 151d irradiated onto the target object 10 when the focusing gradient of the working apparatus with respect to the target object 10 is tilted along the axis of the second direction (±Y direction in FIG. 1).

As illustrated in FIGS. 13A and 13B, when the focusing gradient of the working apparatus with respect to the target object 10 is tilted along the axis of the second direction (±Y direction in FIG. 1), the first line beam 121d, the second line beam 131d, the third line beam 141d, and the fourth line beam 151d irradiated onto the target object 10 may have a ⧣ shape as a whole, wherein the third line beam 141d and the fourth line beam 151d may not be parallel to each other and may be spaced apart from each other by a certain angle θ.

Therefore, as a result of visually checking the states of the first line beam 121d, the second line beam 131d, the third line beam 141d, and the fourth line beam 151d irradiated onto the target object 10, when the first line beam 121d, the second line beam 131d, the third line beam 141d, and the fourth line beam 151d have a ⧣ shape as a whole, the first line beam 121d and the second line beam 131d are not parallel to each other, and/or the third line beam 141d and the fourth line beam 151d are not parallel to each other, the user may determine that the focusing gradient of the working apparatus with respect to the target object 10 is tilted along the axis of the first direction (±X direction in FIG. 1) or the second direction (±Y direction in FIG. 1).

On the other hand, although not illustrated, the focusing state measuring apparatus 100 according to the second embodiment of the present invention may further include a focusing measurement unit (not illustrated) configured to measure the states of the first line beam 121, the second line beam 131, the third line beam 141, and the fourth line beam 151 irradiated onto the target object 10 and determine the focusing state of the working apparatus with respect to the target object 10. The focusing measurement unit may be substantially the same as the focusing measurement unit 160 illustrated in FIG. 8.

As described above, since the focusing state measuring apparatus 100 according to the second embodiment of the present invention determines the focusing state of the working apparatus with respect to the target object 10 by using the states of the first line beam 121, the second line beam 131, the third line beam 141, and the fourth line beam 151 irradiated onto the target object 10, it is possible to more easily and accurately measure the focusing state of the working apparatus with respect to the target object 10 through a simpler structure.

On the other hand, the laser processing apparatus has been described as an example of the working apparatus, but the present invention is not limited thereto. The present invention may also be applied to various types of systems such as a processing apparatus using a robot, as well as the laser processing apparatus 20 such as a laser marking apparatus or a laser welding apparatus.

Since the focusing state measuring apparatuses according to the embodiments of the present invention determine the focusing state of the working apparatus with respect to the target object by using the states of the first line beam and the second line beam irradiated onto the target object, tit is possible to easily measure the focusing state of the working apparatus with respect to the target object through a simpler structure.

In addition, since the focusing state measuring apparatuses according to the embodiments of the present invention determine the focusing state of the working apparatus with respect to the target object by using the states of the first line beam, the second line, the third line beam, and the fourth line beam irradiated onto the target object, it is possible to more easily and accurately measure the focusing state of the working apparatus with respect to the target object through a simpler structure.

The effects of the present invention are not limited to the above-mentioned effects and other effects will be clearly understood by those skilled in the art. As set forth above, the specific embodiments of the present invention have been described herein and illustrated in the drawings. Although specific terms are used herein, all such terms are intended to have the same meaning as commonly understood in order to fully convey the concept of the present invention and for better understanding of the present invention and should not be taken as limiting the scope of the present invention. It is apparent to those skilled in the art that various modifications or alterations can be made thereto without departing from the scope of the present invention.

DESCRIPTION OF REFERENCE NUMERALS

| | |
|---|---|
| 10: target object | 20: laser processing apparatus |
| 100: focusing state measuring apparatus | 110: base plate |
| 120: first line beam generation unit | 130: second line beam generation unit |
| 140: third line beam generation unit | 150: fourth line beam generation unit |
| 160: focusing measurement unit | |

What is claimed is:

1. A focusing state measuring apparatus for measuring a focusing state of a working apparatus with respect to a target object so as to perform work, the focusing state measuring apparatus comprising:
   a base plate installed in the working apparatus performing work on the target object and spaced apart from the target object;
   a first line beam generation unit provided on one side of the base plate and configured to irradiate a first line beam toward the target object; and
   a second line beam generation unit provided on one side of the base plate so as to be spaced apart from the first line beam generation unit in a first direction and configured to irradiate a second line beam toward the target object,
   wherein the focusing state of the working apparatus with respect to the target object is determined according to states of the first line beam and the second line beam, and
   wherein the focusing state of the working apparatus comprises:
      a focusing distance indicating a separation distance between the working apparatus and the target object; and
      a focusing gradient indicating a tilt degree of the working apparatus with respect to a work plane of the target object.

2. A focusing state measuring apparatus for measuring a focusing state of a working apparatus with respect to a target object so as to perform work, the focusing state measuring apparatus comprising:
   a base plate installed in the working apparatus performing work on the target object and spaced apart from the target object;
   a first line beam generation unit provided on one side of the base plate and configured to irradiate a first line beam toward the target object; and
   a second line beam generation unit provided on one side of the base plate so as to be spaced apart from the first line beam generation unit in a first direction and configured to irradiate a second line beam toward the target object,
   wherein the focusing state of the working apparatus with respect to the target object is determined according to states of the first line beam and the second line beam,
   wherein the focusing state of the working apparatus comprises:
      a focusing distance indicating a separation distance between the working apparatus and the target object; and
      a focusing gradient indicating a tilt degree of the working apparatus with respect to a work plane of the target object,
   wherein the focusing distance is determined according to a distance between the first line beam and the second line beam, and the focusing gradient is determined according to an angle between the first line beam and the second line beam or a length difference between the first line beam and the second line beam.

3. The focusing state measuring apparatus of claim 1, further comprising a focusing measurement unit configured to measure the states of the first line beam and the second line beam irradiated onto the target object and determine the focusing state of the working apparatus with respect to the target object.

4. A focusing state measuring apparatus for measuring a focusing state of a working apparatus with respect to a target object so as to perform work, the focusing state measuring apparatus comprising:
   a base plate installed in the working apparatus performing work on the target object and spaced apart from the target object;
   a first line beam generation unit provided on one side of the base plate and configured to irradiate a first line beam toward the target object;
   a second line beam generation unit provided on one side of the base plate so as to be spaced apart from the first line beam generation unit in a first direction and configured to irradiate a second line beam toward the target object;
   a third line beam generation unit provided one side of the base plate so as to be disposed between the first line beam generation unit and the second line beam generation unit and configured to irradiate a third line beam toward the target object; and
   a fourth line beam generation unit provided on one side of the base plate so as to be spaced apart from the third line beam generation unit in a second direction perpendicular to the first direction and configured to irradiate a fourth line beam toward the target object,
   wherein the focusing state of the working apparatus with respect to the target object is determined according to states of the first line beam and the second line beam and states of the third line beam and the fourth line beam.

5. The focusing state measuring apparatus of claim 4, wherein the focusing state of the working apparatus comprises:
   a focusing distance indicating a separation distance between the working apparatus and the target object; and
   a focusing gradient indicating a tilt degree of the working apparatus with respect to a work plane of the target object.

6. The focusing state measuring apparatus of claim 5, wherein the focusing distance is determined according to a distance between the first line beam and the second line beam or a distance between the third line beam and the fourth line beam, and
   the focusing gradient is determined according to an angle between the first line beam and the second line beam, an angle between the third line beam and the fourth line beam, a length difference between the first line beam and the second line beam, or a length difference between the third. line beam and the fourth line beam.

7. The focusing state measuring apparatus of claim 4, further comprising a focusing measurement unit configured to measure the states of the first line beam and the second line beam irradiated onto the target object and the states of the third line beam and the fourth line beam irradiated onto the target object and determine the focusing state of the working apparatus with respect to the target object.

* * * * *